United States Patent [19]
Kliskey

[11] Patent Number: 5,971,052
[45] Date of Patent: Oct. 26, 1999

[54] TIRE MOUNT/DEMOUNT BAR

[75] Inventor: Roger Kliskey, Stow, Ohio

[73] Assignee: Summit Tool Company, Akron, Ohio

[21] Appl. No.: 08/961,975

[22] Filed: Oct. 31, 1997

[51] Int. Cl.[6] .............................. B60C 25/00; B60C 25/04
[52] U.S. Cl. ................................................. 157/1; 157/1.3
[58] Field of Search ................................. 157/1, 1.17, 1.3

[56] References Cited

U.S. PATENT DOCUMENTS

| | | |
|---|---|---|
| D. 134,799 | 1/1943 | Taylor . |
| 355,754 | 1/1887 | Beck . |
| 2,344,704 | 3/1944 | Krantz . |
| 2,571,517 | 10/1951 | Aycock . |
| 4,403,640 | 9/1983 | Schifferly ................................. 157/1.3 |
| 4,919,184 | 4/1990 | du Quesne . |
| 5,143,134 | 9/1992 | Tran . |
| 5,213,146 | 5/1993 | Onozawa . |
| 5,417,270 | 5/1995 | Brunner . |

Primary Examiner—James G. Smith
Attorney, Agent, or Firm—Renner, Kenner, Greive, Bobak, Taylor & Weber

[57] ABSTRACT

A tool for use in conjunction with a center-post tire changing machine for mounting and demounting pneumatic tires from wheel rims includes an elongated shaft member having first and second ends wherein a portion of the elongated shaft member defines a main plane of the tool. A tire mounting portion at the first end includes a rounded first face forming a bead contact area, a flat second face forming a rim contact area, and a retaining knob protruding from the flat second face, the tire mounting portion being angularly offset from the main plane vertically by a first bend and horizontally by a second bend. A tire demounting portion at the second end includes a rounded first face forming a bead contact area, a flat second face forming a rim contact area, and a retaining knob protruding from the flat second face. The tire demounting portion is angularly offset both horizontally and vertically from the main plane by a third bend.

17 Claims, 2 Drawing Sheets

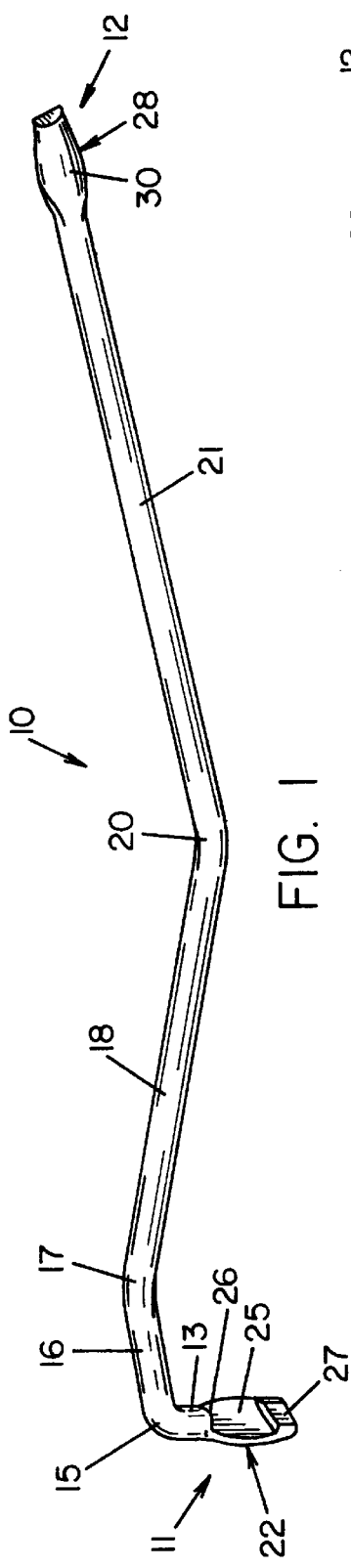
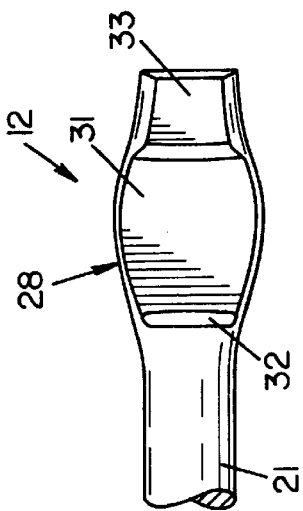
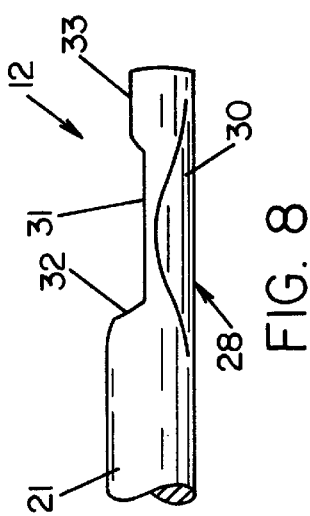
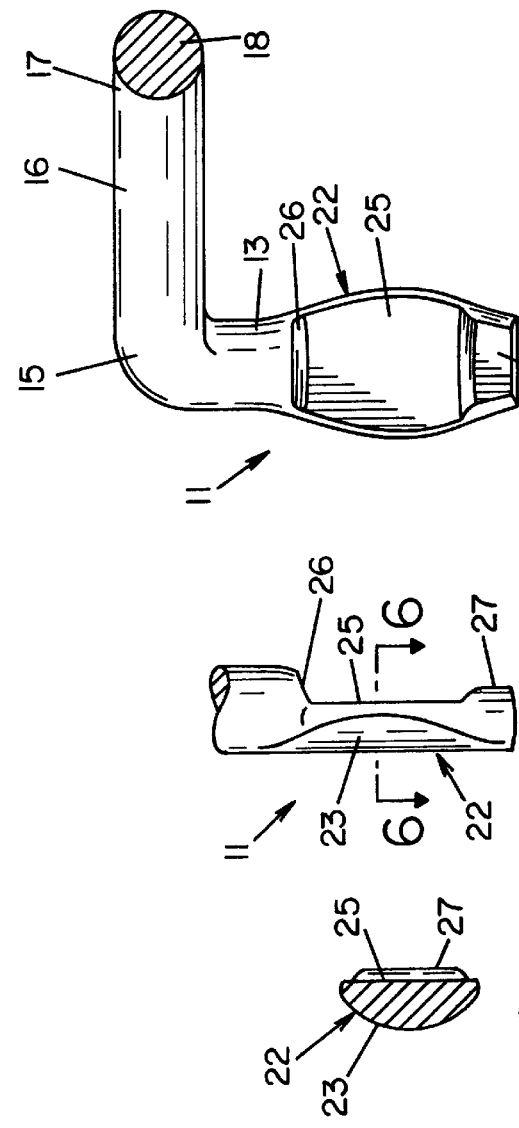

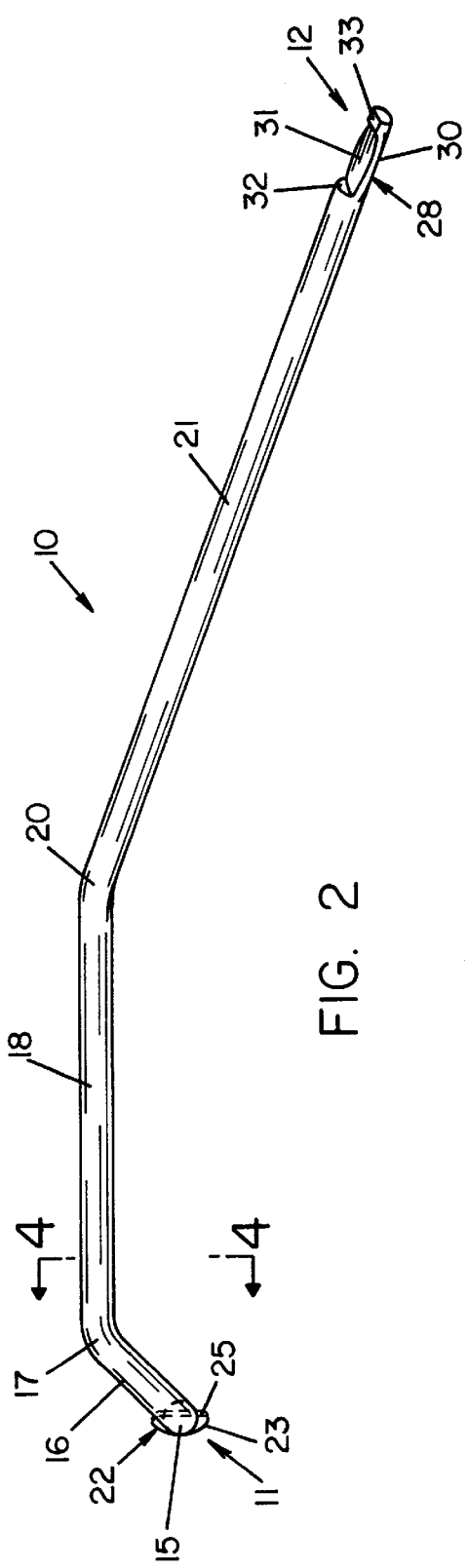
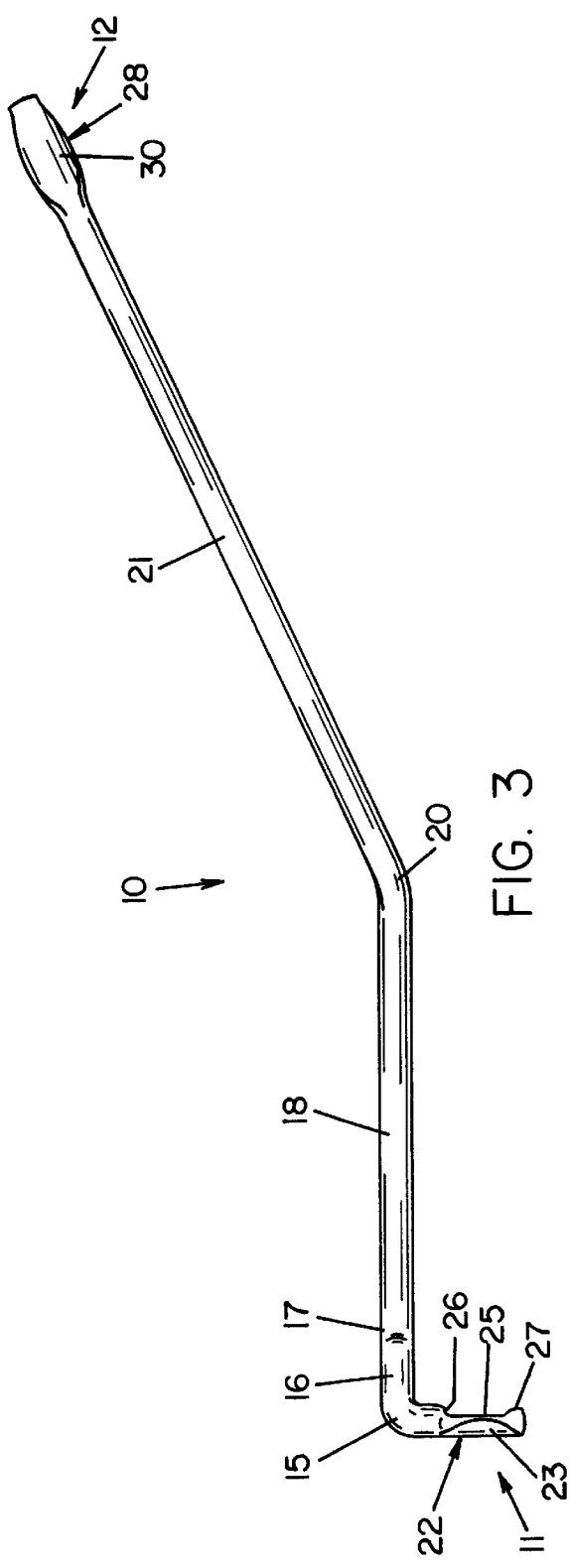

ures, 5,971,052

TIRE MOUNT/DEMOUNT BAR

TECHNICAL FIELD

The present invention relates generally to tools used for mounting and demounting tires from wheel rims. More particularly, the present invention relates to combination tools having a part for mounting tires and a part for demounting tires. Specifically, the present invention relates to such a tool used to mount or demount tires positioned on small center-post tire changing machines.

BACKGROUND OF THE INVENTION

For as long as it has been known to use pneumatic tires on wheeled vehicles, it has been necessary to change and/or remove the tire from the rim for replacement or repair. In that time, a variety of tools have been developed and utilized to facilitate the mounting and demounting of tires. Such tools typically comprise an elongated bar having a handle end and a tool end adapted to be inserted between the tire bead and the wheel rim. The tool end frequently has a flattened or tapered portion which may be straight, curved, or bent at an angle. After the tool portion is inserted between the bead and the rim, the user applies pressure to the handle, making a lever of the tool by utilizing the wheel rim as a fulcrum. This procedure allows the tire bead to be stretched over the rim by moving the bar around the periphery of the tire. In more recent years, machines have been developed which rotate the tire in conjunction with the use of the tool to alleviate the need for moving the tool.

While the prior art is replete with variations of mounting/demounting tools, the basic design has not changed significantly over the years. However, the known designs do have disadvantages. For example, because these tools are designed to be used as a lever the user must apply a constant and even pressure to assure proper stretching of the tire without letting the tool slide out of the tire. Further, such tools having a tapered end tend to roll as the tire is rotated and/or as the tool is moved around the periphery of the tire causing the tool to become dislodged or at least requiring more control by the user.

Accordingly, there is a need for a combined tire mounting/demounting tool which can be interposed between a tire bead and wheel rim to operatively stretch the bead over the rim without the need for precise pressure and control from the user.

SUMMARY OF INVENTION

Thus, a primary object of the present invention is to provide a combined tool for mounting and demounting a tire from a wheel rim.

Another object of the present invention is to provide such a tool which does not require excessive pressure or leverage on the part of the user.

A further object of the present invention is to provide such a tool which will not roll or become dislodged in use.

Still another object of the present invention is to provide such a tool which is ergonomically adapted for comfortable, non-strenuous application by the user.

Yet another object of the present invention is to provide such a tool which works equally well on all wheels without regard to rim diameter.

A still further object of the present invention is to provide such a tool which is in one piece, thus eliminating small costly, separately purchased or forged parts as well as the need for assembly and/or welding.

At least one or more of the foregoing objects, together with the advantages thereof over the known art relating to tire mounting and dismounting bars, which shall become apparent from the specification which follows, are accomplished by the invention as hereinafter described and claimed.

In general, the present invention provides a tool for use in conjunction with a center-post tire changing machine for mounting and demounting pneumatic tires from wheel rims includes an elongated shaft member having first and second ends wherein a portion of the elongated shaft member defines a main plane of the tool. A tire mounting portion at the first end includes a rounded first face forming a bead contact area, a flat second face forming a rim contact area, and a retaining knob protruding from the flat second face. The tire mounting portion is angularly offset from the main plane, vertically by a first bend, and horizontally by a second bend. A tire demounting portion at the second end includes a rounded first face forming a bead contact area, a flat second face forming a rim contact area, and a retaining knob protruding from the flat second face. The tire demounting portion is angularly offset both horizontally and vertically from the main plane by a third bend.

BRIEF DESCRIPTION OF THE DRAWINGS

FIG. 1 is a perspective view of the tire mount/demount bar according to the invention;

FIG. 2 is a top plan view of the tire mount/demount bar according to the invention;

FIG. 3 is a front elevational view of the tire mount/demount bar according to the invention;

FIG. 4 is an enlarged sectional view taken along line 4—4 of FIG. 2;

FIG. 5 is a view of a first end of the bar;

FIG. 6 is a sectional view taken along line 6—6 of FIG. 5;

FIG. 7 is a top plan view of the second end of the bar; and,

FIG. 8 is an elevational view of the second end of the bar.

PREFERRED EMBODIMENT FOR CARRYING OUT THE INVENTION

Referring now to the drawings, it can be seen that a tire mount/demount bar according to the concepts of the present invention is designated generally by the numeral 10. Bar 10 is an elongated shaft having a round cross-section and made of a steel alloy or other appropriate material and including a first end 11 and a second end 12, as shown. For purposes of clarity, the one-piece bar 10 will be described with reference to four distinct portions. To that end, a first portion 13 of bar 10 is defined between first end 11 and a first bend 15. A second portion 16 is defined between first bend 15 and a second bend 17. Similarly, a third portion 18 of bar 10 is defined between second bend 17 and a third bend 20. Finally, a fourth portion 21 is defined between third bend 20 and second end 12. For the purpose of describing the structure of bar 10, the reference plane of bar 10 is defined both horizontally and vertically by third portion 18. As such, second portion 16 of bar 10 is preferably disposed at an approximate 45° angle from the vertical plane at second bend 17. Similarly, fourth portion 21 of bar 10 is preferably disposed at an approximate 15°–25° angle to the vertical plane and also at an approximate 15°–25° angle to the horizontal plane. First bend 15 is, as shown, disposed preferably at a 90° angle to the horizontal plane.

First end 11 of bar 10 is the portion of bar 10 which is used for tire mounting. As such, first end 11 is adapted to engage the tire bead and wheel rim for mounting a tire. As shown, first end 11 has an expanded semi-circular portion 22 having a rounded outer face 23 and a flat inner face 25. Similarly, an upper face 26 is formed where semi-circular portion 22 meets the main body at the bar shaft. Further, a retaining knob 27 is located at the lower edge at semi-circular portion 22 on flat inner face 25.

Second end 12, which is used for tire demounting, has a similar structure to first end 11 in that it also has an expanded semi-circular portion 28 having a rounded lower face 30 and a flat upper face 31. An inner face 32 is again formed where semi-circular portion 28 meets the main shaft. As with first end 11, second end 12 also has a retaining knob 33 opposing inner face 32. It will be appreciated from the drawings that semicircular portion 28 of second end 12 is concentrically disposed on the same longitudinal axis as fourth portion 21 of the shaft.

In operation, bar 10 is used in conjunction with a conventional center-post tire changing machine wherein the tire and wheel to be changed are placed over a stationary center post with the post extending through the hub aperture as is well known in the art. The rim and tire are held stationary relative to the center post and a working end of the bar 10 is interposed between the tire bead and the wheel rim. If the tire is to be mounted on the rim, semi-circular portion 22 of first end 11 is interposed between the tire bead and wheel rim such that flat inner face 25 is in contact with the wheel rim, and rounded outer face 23 is in contact with the tire bead. The user then grasps the shaft proximate to second end 12 and draws bar 10 against the center post. Bar 10 contacts the center post at a point along third portion 18, which point will vary according to the diameter of the particular rim, thus forming a pivot point around which bar 10 may be rotated. Accordingly, as the user pulls bar 10 in a clockwise direction around the center post, the tire bead is progressively slid over the rim. The process can then be repeated with the second bead of the tire. It will be appreciated that bar 10 can be bent at similar angles in the opposite direction from the main plane to facilitate use of bar 10 in the counterclockwise direction for those users who require such an alternative.

Where the tire is to be removed from the rim, second end 12 of bar 10 may be used. Specifically, semicircular portion 28 of second end 12 is interposed between the tire bead and the wheel rim such that flat upper face 31 is in contact with the wheel rim, and rounded lower face 30 is in contact with the tire bead. The user then grasps the shaft proximate to first end 11 and draws bar 10 against the center post at a point along fourth portion 21, which point will, again, vary according to the diameter of the particular rim, again forming a pivot point around which bar 10 may be rotated. As the user again pulls bar 10 in a clockwise direction around the center post, the tire bead is slid over the rim so that the tire may be removed.

As can be seen, the unique bends of bar 10 facilitate the use thereof by making bar 10 more ergonomic. For example, first and second bends 15 and 17, respectively, serve to keep flat inner face 25 tangent to the wheel rim and also to prevent the tool from rotating about its own axis in use. Third bend 20 serves both to overcome the tendency for the tire to turn bar 10 out of the rim/bead area during use and to present the non-working end of bar 10 at a more comfortable height above the tire surface.

Further, the rim contact areas formed by flat faces 25 and 32 are essentially depressed with respect to the rest of the tool. That is to say, faces 26 and 31, and knobs 27 and 33 extend outwardly relative to flat faces 25 and 31. Accordingly, faces 26 and 32 and knobs 27 and 33 serve to retain the working portion of the tool in contact with the bead and rim without precise control on the part of the user.

Thus it should be evident that the tool and method of the present invention are highly effective in facilitating the removal or mounting of pneumatic tires on rims. The invention is particularly suited for center-post tire changing machines, but is not necessarily limited thereto. The device and method of the present invention can be used separately with other equipment, methods and the like. Likewise, the tool and method may be used with tires and rims of varying diameters. Further, the one-piece configuration of the tool reduces manufacturing and assembly costs.

Based upon the foregoing disclosure, it should now be apparent that the use of the tool described herein will carry out the objects set forth hereinabove. It is, therefore, to be understood that any variations evident fall within the scope of the claimed invention and thus, the selection of specific component elements can be determined without departing from the spirit of the invention herein disclosed and described. In particular, tools made according to the present invention are not necessarily limited to those having the specific bend angles discussed herein. Thus, the scope of the invention shall include all modifications and variations that may fall within the scope of the attached claims.

What is claimed is:

1. A tool for use in conjunction with a center post of a center-post tire changing machine for mounting a pneumatic tire on a wheel rim comprising:

an elongated shaft member having first and second ends, wherein a portion of said elongated shaft member defines a main plane of the tool and includes a pivot point disposed against the center post during mounting for rotating said shaft member around the center post;

a tire mounting portion proximate said first end, said tire mounting portion being at least vertically offset from said main plane; and, a grasping portion proximate said second end, said grasping portion also being at least vertically offset from said main plane at an angle sufficient to prevent said tire mounting portion from turning out from between the tire and the rim during mounting, and wherein said pivot point is closer to said first end than said angle between said grasping portion and said main plane-defining portion of the shaft member is to said first end during mounting.

2. A tire mounting tool according to claim 1, wherein said tire mounting portion comprises a rounded first face and a flat second face, said rounded first face forming a bead contact area and said flat second face forming a rim contact area.

3. A tire mounting tool according to claim 1, wherein said grasping portion includes a tire demounting portion comprising a rounded first face and a flat second face, said rounded first face forming a bead contact area and said flat second face forming a rim contact area.

4. A tire mounting tool according to claim 2, wherein said tire mounting portion further comprises a retaining knob protruding outwardly from said flat second face.

5. A tire mounting tool according to claim 3, wherein said tire demounting portion further comprises a retaining knob protruding outwardly from said flat surface.

6. A tire mounting tool according to claim 1, wherein said tire mounting portion is angularly offset from said main plane, vertically be a first bend, and horizontally by a second bend.

7. A tire mounting tool according to claim 6, wherein said first bend is made at an approximate 90° angle to said main plane-defining portion of said shaft member.

8. A tire mounting tool according to claim 6, wherein said second bend is made at an approximate 45° angle to said main plane-defining portion of said shaft member.

9. A tire mounting tool according to claim 1, wherein said grasping portion includes a tire demounting portion which includes a second pivot point disposed against the center post during tire demounting for rotating said shaft member around the center post on the tire changing machine.

10. A tire mounting tool according to claim 1, wherein said grasping portion is vertically offset from said main plane in a direction opposite that which tire mounting portion is vertically offset from said main plane.

11. A tire mounting tool according to claim 10, wherein said grasping portion is angularly offset from said main plane both vertically and horizontally by a third bend.

12. A tool for use in conjunction with a center-post tire changing machine for mounting and demounting pneumatic tires from wheel rims comprising:

an elongated shaft member having first and second ends wherein a portion of said elongated shaft member defines a main plane of the tool;

a tire mounting portion at said first end comprising a rounded first face forming a bead contact area, a flat second face forming a rim contact area, and a retaining knob protruding from said flat second face, said tire mounting portion being angularly offset from said main plane vertically by a first bend and horizontally by a second bend; and, a tire demounting portion at said second end comprising a rounded first face forming a bead contact area, a flat second face forming a rim contact area, and a retaining knob protruding from said flat second face, said tire demounting portion being angularly offset both horizontally and vertically from said main plane by a third bend.

13. A tire mounting/demounting tool according to claim 12, wherein said first bend is made at an approximate 90° angle to said main plane of the shaft member.

14. A tire mounting/demounting tool according to claim 12, wherein said second bend is made at an approximate 45° angle to said main plane of the shaft member.

15. A tire mounting/demounting tool according to claim 12, wherein said pivot point for rotating said shaft member around the center point on the tire changing machine is formed between said second and third bends for tire mounting.

16. A tire mounting/demounting tool according to claim 12, wherein a pivot point for rotating said shaft member around the center post on the tire changing machine is formed between said third bend and said second end for tire demounting.

17. A method for mounting a pneumatic tire having a bead to a rim of a wheel using a tire changing machine having a center post and a tool having a mounting end comprising the steps of:

placing the wheel and tire over the center post of the tire changing machine;

interposing the mounting end of the tool having a surface disposed at an approximate 90° angle to a main plane of the tool between the tire bead and the wheel rim such that the surface contacts the wheel rim;

grasping the end of the tool opposite the mounting end, said grasping end of the tool being disposed at an angle above said main plane of the tool sufficient to prevent the mounting end from turning out from between the tire bead and the rim;

drawing the tool against the center post of the machine to provide a pivot point for pivotally rotating the tool around the center post, said pivot point being closer to said mounting end than said angle between said grasping end and said main plane of the tool is to said mounting end; and, pivotally rotating the tool around the center post of the machine such that the mounting end of the tool stretches the tire bead over the rim.

\* \* \* \* \*